Sept. 30, 1941.  A. C. DAVIDSON  2,257,109
TRUCK STABILIZER
Filed Aug. 23, 1938  3 Sheets-Sheet 1

INVENTOR.
Arthur C. Davidson
BY:- Cox & Moore
ATTORNEYS

Sept. 30, 1941.   A. C. DAVIDSON   2,257,109
TRUCK STABILIZER
Filed Aug. 23, 1938   3 Sheets-Sheet 2
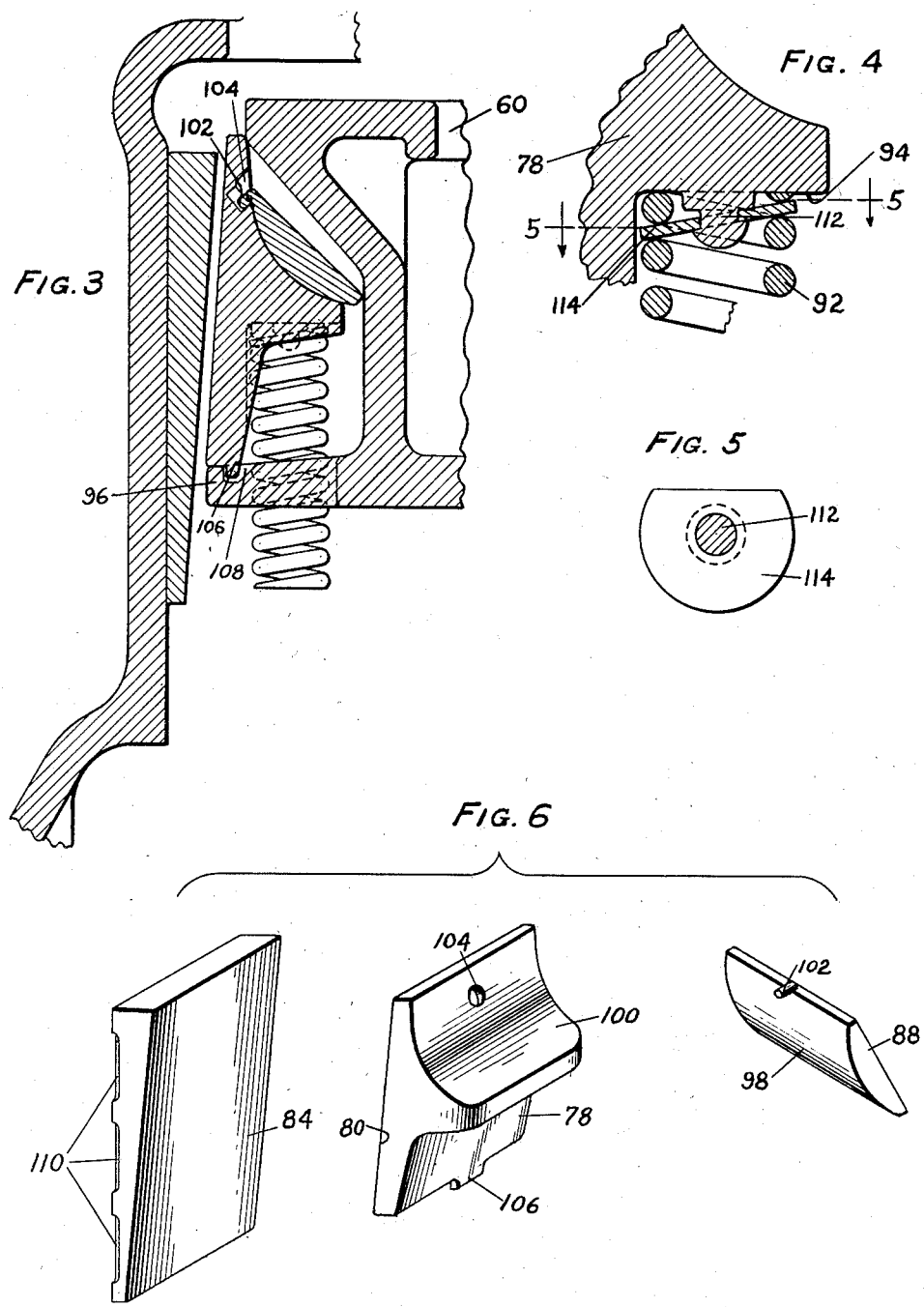

Sept. 30, 1941.  A. C. DAVIDSON  2,257,109
TRUCK STABILIZER
Filed Aug. 23, 1938  3 Sheets-Sheet 3
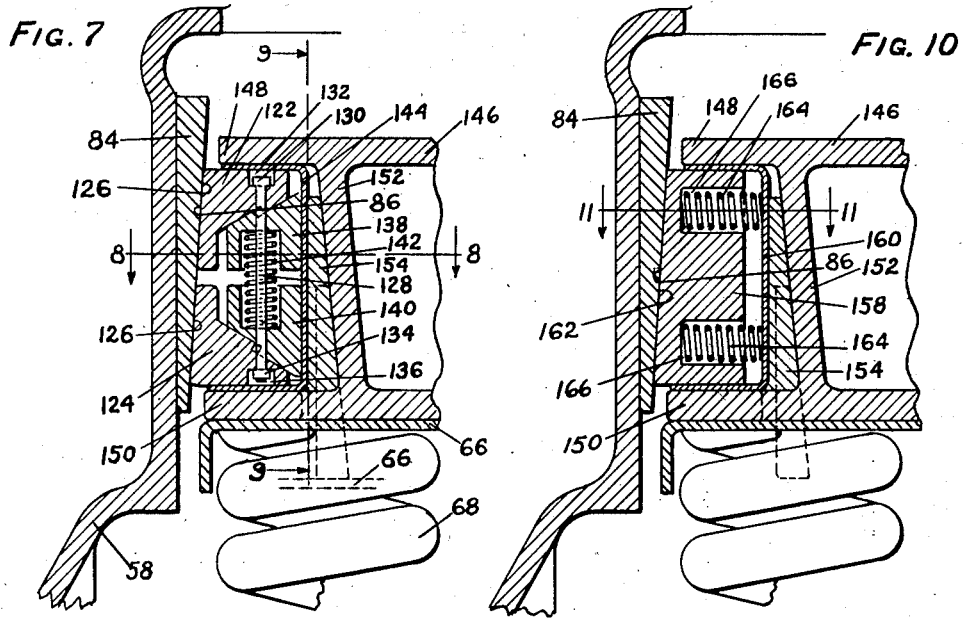
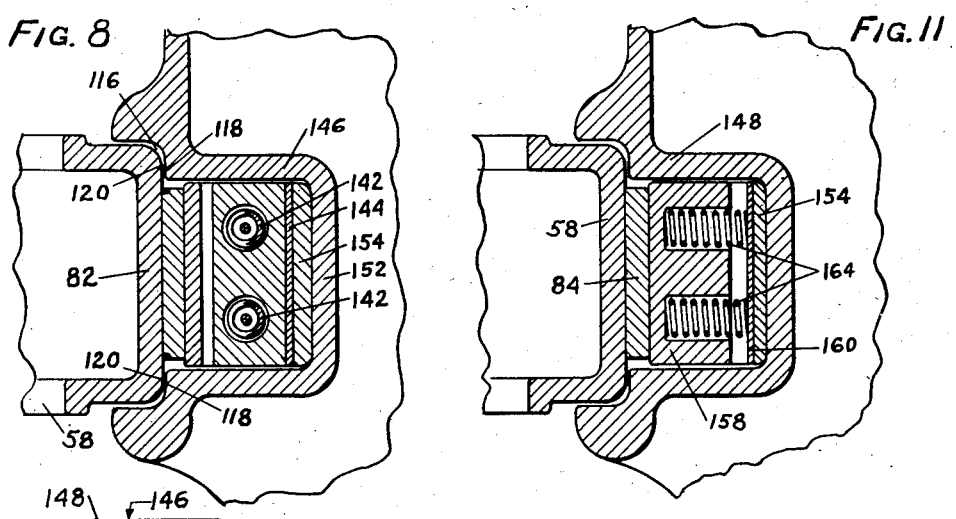
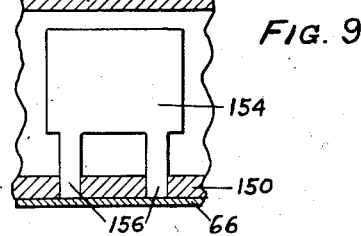
INVENTOR.
Arthur C. Davidson
BY: Cox & Moore
ATTORNEYS Patented Sept. 30, 1941

2,257,109

UNITED STATES PATENT OFFICE 2,257,109

TRUCK STABILIZER

Arthur C. Davidson, Chicago, Ill.

Application August 23, 1938, Serial No. 226,266

15 Claims. (Cl. 105—193)

This invention has for one of its objects the provision of a truck stabilizing device including a minimum of operating parts which may be readily assembled into the completed device.

Another important object of the invention is to provide in a truck stabilizing device vibration dampening means capable of exerting a dampening effect upon the rebound of the bolster which is greater than its dampening effect exerted upon the original deflection of the bolster so that the shock which occasions the original deflection may be properly cushioned by the bolster supporting springs and sudden rebound effectively prevented.

A further object is to provide in a device of the character stated, vibration dampening wedge means movable relative to the bolster in a direction opposite to the direction of movement of the latter so that vibration of the bolster may be more effectively prevented.

Still more specifically, my invention contemplates a wedge and chafing plate arrangement in combination with a bolster, wherein the inclination of the contacting surfaces of said parts with respect to the direction of the imposed vibrations is such as to make for maximum efficiency in dampening rebound of the bolster.

The foregoing and numerous other objects and advantages will be more apparent from the following detailed description when considered in connection with the accompanying drawings, wherein:

Fig. 3 is an enlarged and fragmentary vertical section showing the manner of assembling the several elements to form the completed device.

Fig. 4 is a further enlarged fragmentary view in vertical section of a portion of Fig. 3 and showing the manner of assembling the dampening springs with the wedge means.

Fig. 5 is a view in section taken along the line 5—5 of Fig. 4.

Fig. 6 is an exploded view of the elements which constitute the wedge and chafing plate structure.

Fig. 7 is a fragmentary sectional view showing a modified form of the invention.

Fig. 8 is a horizontal section taken substantially along the line 8—8 of Fig. 7.

Fig. 9 is a vertical section taken substantially along the line 9—9 of Fig. 7.

Fig. 10 is a fragmentary view in section similar to Fig. 7 but showing another modified form of the invention.

Fig. 11 is a horizontal section taken along the line 11—11 of Fig. 10.

Figure 1:
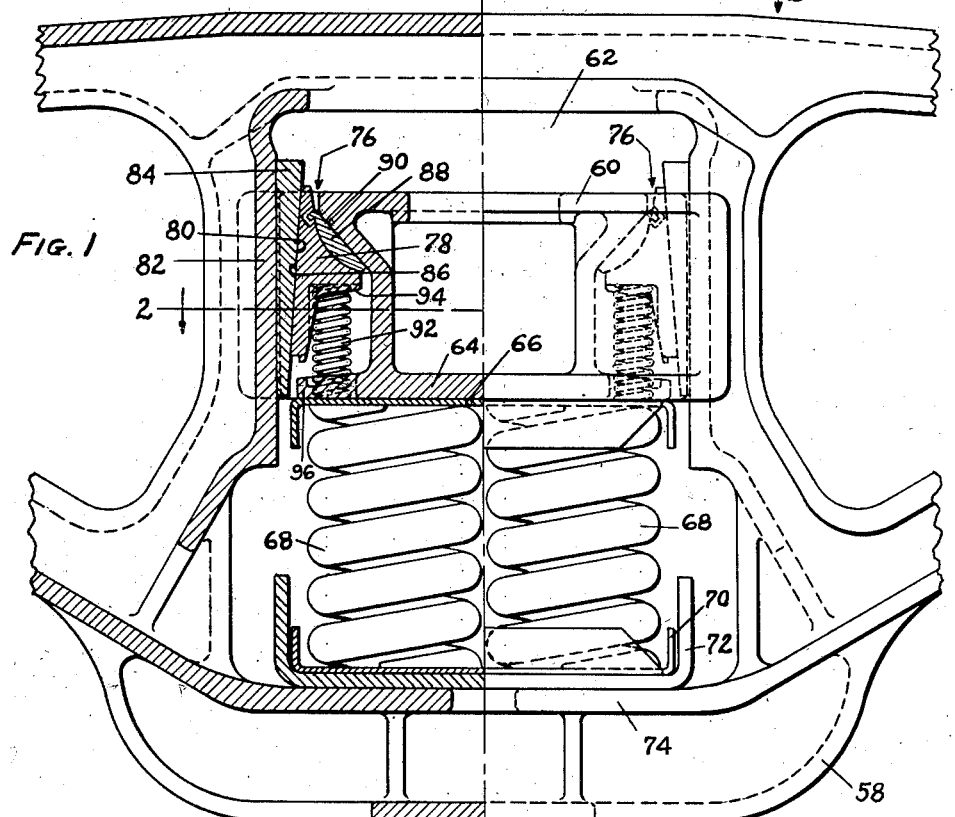
Fig. 1 is a fragmentary side elevational view of a truck side frame and bolster, a portion of the bolster and a portion of the side frame being shown in section to illustrate more clearly the disposition of my improved wedge and chafing plate structure.

As illustrated in Figs. 1 to 6, the invention comprises a side frame 58 and a bolster 60, the outer end of which extends within a recess 62 in the side frame. Each truck comprises a pair of side frames and a bolster extending between said side frames and since the same mounting structure is employed at each end of the bolster, a disclosure of the mounting of one end of the bolster will suffice for a clear understanding of the present invention.

The lower frame section 64 of the bolster 60 rests upon a suitable plate or apron 66 which, in turn, is supported by the bolster supporting coil springs 68. These coil springs rest at their lower extremities upon a suitable spring retainer 70 which is in turn mounted upon a plate 72 carried by the lower section 74 of the side frame. The forces tending to force the bolster downwardly are yieldably resisted by the heavy duty coil springs 68. It has been found in practice that these coil springs 68 cannot suffice to cushion the bolster 60 because in rebounding they cause the bolster to vibrate in a manner which at high speeds is particularly obnoxious.

The means for checking or dampening vibrations set up by the rebounding of the bolster springs comprises a dampening mechanism 76 for each side of the bolster 60. This mechanism includes a wedge 78 having a friction surface 80 which in assembled position is inclined in a downwardly direction toward the upright portion 82 of the side frame 58. A chafing plate 84 is interposed between the wedge 78 and the upright portion 82 of the side frame and is provided with a friction surface 86 which in a downward direction is also inclined toward the upright portion 82 of the side member. An adjusting block 88 is interposed between the wedge 78 and the inclined surface 90 of the bolster 60. The chafing plate 84 is suitably secured in any desired manner, as by welding or the like, to the upright portion 82 of the side frame. A pair of coiled springs 92 is interposed between the shoulder 94 of the wedge 78 and the upper surface of the spring retaining plate or apron 66, these springs passing through suitable openings in the laterally extending flanges or feet 96 of the bolster 60. The coil springs 92 are considerably lighter in construction than the heavy duty bolster springs 68.

Particular attention is directed to the fact that complementary friction surfaces 80 and 86 of the wedge 78 and the chafing plate 84, respectively, are, in a downward direction, inclined toward the upright portion 82 of the side frame.

The adjusting block 88 is provided with an arcuate undersurface 98 adapted to seat upon a similarly shaped arcuate surface 100 of the wedge 78 and the adjusting block 88 is provided with a laterally extending pin or projection 102 adapted to be received within an opening 104 in the wedge 78 to support the adjusting block 88 upon the wedge 78 when the parts are being assembled.

The wedge 78 is provided at its lower end with a depending lug or projection 106 to facilitate the assembly of the several parts of the device as shown in Fig. 3, the lug 106 during assembly of the device being inserted in an opening 108 (Fig. 3) in the foot 96 of the bolster. The chafing plate 84 is provided with spaced grooves 110 along its opposite rear edges to facilitate the welding of the plate to the upright portion 82 of the side frame.

In assembling the several elements of the device each spring 92 is first positioned over lug 112 depending from the shoulder 94 of the wedge 78, as best shown in Fig. 4. A spring retaining washer 114 is then placed over the lug 112 as shown in Fig. 4, and the lower end of the lug peened over to hold the washer in position. The adjusting block 88 is then positioned on the wedge 78 with its pin 102 extending into the aperture 104 in the wedge, as best shown in Fig. 3. The wedge 78 with the assembly block and the springs attached thereto is then assembled with the bolster 60 by first passing the springs through the openings provided in the foot 96 of the bolster and then inserting the lug 106 in the opening 108. The wedge, with the other parts attached, is retained in this assembled relation with the bolster during the insertion of the bolster into the side frame by reason of the engagement of the lug 106 in the opening 108, the engagement of the adjusting block 88 and the upper edge of the wedge with the side of the bolster (as shown in Fig. 3). After the bolster has been inserted into the side frame and positioned on top of the plate 66, the compression of the springs 92 raises the wedge 78 and the adjusting block 88 to the positions shown in Fig. 1. It should be noted that the opening 104 in the wedge 78 is sufficiently enlarged to permit movement of the adjusting block 88 relative to the bolster and the wedge so as to accommodate itself to the opposed surfaces of these parts.

It will be apparent from the foregoing description that the springs 92 are under compression when the bolster 60 occupies its normal position (as shown in Fig. 1). As the bolster travels downwardly its movement is cushioned by the heavy duty springs 68 assisted by the frictional forces set up by the engagement of the friction surfaces 80 and 86 of the wedge 78 and the chafing plate 84. Since, as the bolster 60 moves downwardly the wedge plate 78 moves outwardly, being maintained in contact with the chafing plate 84 by the springs 92, the bolster and the wedge move relatively in opposite directions. As the bolster 60 moves upwardly due to the rebounding of the heavy duty spring 68, the wedge 78 is forced upwardly along the chafing plate 84 and wedged with an increasing force between this chafing plate and the surface 90 of the bolster, the rate of upward movement of the wedge being, of course, less than the rate of upward movement of the bolster 60 so that the wedge 78 moves downwardly relative to the bolster and moves upwardly with respect to the chafing plate. This movement of the wedge relative to the chafing plate and relative to the bolster 60 therefore sets up forces which exert a greater dampening effect upon the rebounding of the bolster than was set up by these parts during the downward deflection of the bolster. The heavy duty bolster supporting springs 68 are therefore permitted to exert a practically maximum cushioning effect upon the downward movement of the bolster and at the same time rebounding of the bolster caused by the springs 68 is dampened by a force which increases rapidly in proportion to the distance of rebounding of the bolster.

The arcuate surfaces 98 and 100 of the adjusting block and the wedge permit the block to rock within the wedge and thus render the wedge self-adjustable to any normal variation in the spacing and alinement of the side frame casting and bolster such as is encountered in the normal manufacture of these parts. Should the inclination of the surface 90 vary slightly, the blocks 88 will automatically adjust themselves to compensate for such variation. In instances where this self-adjustment is not required, the use of the blocks 88 may be dispensed with and the wedge member 78 designed to engage directly the surface 90. Suitable clearance 116 is provided between the bolster and side frame structures to accommodate the relative movement of these parts.

From the foregoing it will be seen that the invention contemplates the provision in combination with the bolster, spring and side frame of an effective stabilizing means. The fact that the friction surfaces 80 and 86 are in a downward direction inclined away from the vertical axis or the axis of vertical movement of the bolster relative to the side frame produces a very effective mechanism for dampening the vibrations of the bolster by inclining these surfaces in this manner. The wedge is permitted to move outwardly as it moves downwardly relative to the side frame while at the same time it moves upwardly relative to the bolster. This therefore prevents the possibility of any freezing of the complementary surfaces which would cause improper "riding" of the bolster and breakage of the several parts.

Figure 2:
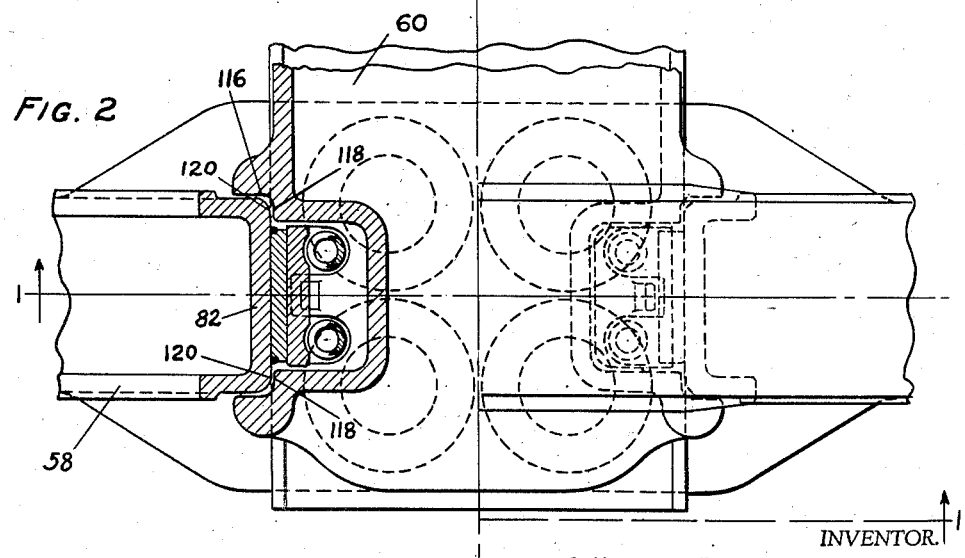
Fig. 2 is a plan view partly in section taken along the line 2—2 of Fig. 1.

As shown in Fig. 2, the bolster 60 is provided with shoulders 118 which are adapted to engage the adjacent sections or shoulders 120 of the side frame. Under normal operating conditions the clearance 116 is maintained between the shoulders 118 and 120 as clearly shown in Fig. 2, but if, by reason of the application of the brakes or for other reasons, the bolster is shifted longitudinally of the car, this clearance will be taken up and the shoulders will then engage each other so as to prevent damage to the stabilizing device.

The adjusting block 88 also compensates for any weaving or twisting of the bolster relative to the side frame.

In the form of the invention shown in Figs. 7 and 8, the wedge means comprises opposed blocks 122 and 124 each having a friction surface 126 complementary to the inclined friction surface 86 of the chafing plate 84, the blocks 122 and 124 being spaced apart upon a rod 128 having its head 130 received in a recess 132 in the upper edge of the block 122 and its lower end receiving a nut 134 in a recess 136 in the edge of the block 124. The blocks 122 and 124 are held in spaced apart relation by a pair of blocks 138 and 140 mounted upon the rod 128 and resiliently maintained in engagement with the blocks 122 and 124 by a coil spring 142. Each pair of blocks 122 and 138 and 124 and 140 have complementary interengaging inclined surfaces permitting relative lateral movement between the blocks and the blocks of each pair are provided with normally spaced shoulders (as shown in Fig. 7) for limiting the relative lateral movement of the blocks. A U-shaped mounting plate 144 encloses the set of four blocks and prevents lateral movement of the blocks 138 and 140 toward the bolster 146.

In this form of the invention the bolster 146 is of the "double-H" type providing parallel top and bottom flanges 148 and 150 and having adjacent each side an inclined transverse web 152. The U-shaped mounting plate 144 with the set of four blocks between its parallel legs is therefore directly receivable between the flanges 148 and 150 of the bolster 146 and a filler block or wedge 154 is inserted between the base of the mounting plate 144 and the inclined web 152 of the bolster.

It will be apparent from this description of the form of the invention shown in Figs. 7 and 8 that the blocks 122 and 124 under the control of the spring 142 exert a greater dampening effect upon the rebound of the bolster than they do upon the original deflection in the same manner as explained with reference to the form of the invention shown in Figs. 1 and 2.

In order to facilitate the assembling of the bolster, the wedge means and the side frame, the filler block or wedge 154 is formed as shown in Fig. 9. As shown in this figure the wedge is provided with a pair of depending fingers or projections 156 adapted to extend through suitable apertures provided in the base flange 150 of the bolster 146 and when the bolster with its wedge means is placed in position in the side frames and lowered upon the heavy duty springs, the projections 156 will engage the plate 66 and be forced upwardly behind the mounting plate 144 and, in being thus moved upwardly, force the wedge blocks 122 and 124 into engagement with the chafing plate 84.

In the form of the invention shown in Fig. 10, the chafing plate 84 cooperates with a wedge block 158 slidably carried between the legs of a U-shaped plate 160 mounted between the top and bottom flanges 148 and 150 of the bolster 146. The wedge block 158, which has a friction surface 162 for engaging the friction surface 86 of the chafing plate, is maintained in working position by a pair of coil springs 164 received within openings 166 in the block 158 and each bearing at one end against this block and at the other end against the mounting plate 160. The wedge 154 is interposed between the mounting plate 160 and the inclined web 152 of the bolster. In this form of the invention the force with which the wedge is pressed into engagement with the chafing plate decreases slightly as the bolster moves downwardly but increases as the bolster moves upwardly, which further increases the differential between the dampening effect occasioned upon downward movement of the bolster and the dampening effect occasioned by the rebound of the bolster.

In assembling the bolster with the side frame when employing the wedge means of Fig. 7 or Fig. 10, the wedge blocks of Fig. 7 or the block of Fig. 10 is first inserted with its mounting plate in the space between the top and bottom flanges 148 and 150 of the bolster and are placed sufficiently deeply within this space so that when the end of the bolster is inserted between the side frames, the wedge means or blocks will not engage the chafing plate. The bolster is then lowered upon the heavy duty springs 68 and, as previously described, the plate 66 forces the filler wedge 154 upwardly in contact with the outer surface of the inclined web 152 of the bolster thereby to force the wedge means into engagement with its chafing plate.

It will be apparent from the foregoing description that applicant's invention provides a truck stabilizing device in which the vibration dampening means exerts a greater dampening upon the rebound of the bolster to effectively prevent vibration of the bolster while at the same time permitting proper cushioning of the bolster by the heavy duty springs. It will be further apparent that applicant's invention provides an efficient truck stabilizing device including a minimum number of operating parts which are capable of ready assembly into the completed device.

The invention is hereby claimed as follows:

1. In combination with a bolster having a side surface which in a downward direction is inclined toward the central vertical plane passing longitudinally of the bolster, a side frame having an opening to receive one end of the bolster, stabilizing means cooperatively arranged with the bolster and including means on the side frame providing a chafing surface which in a downward direction is inclined away from the central vertical plane passing longitudinally of the bolster, wedge means arranged between said chafing surface and said inclined bolster surface and having a complementary surface engaging said chafing surface, a second converging surface complementarily engaging the bolster surface, said wedge means being adapted to be forced upwardly with respect to the bolster and outwardly with respect to the bolster in response to a downward movement of the bolster and resilient means cooperatively arranged with respect to the wedge means and the bolster to yieldably urge the same into operative engagement with the chafing surface and the bolster.

2. In combination with a bolster having a side surface which in a downward direction is inclined toward the central vertical plane passing longitudinally of the bolster, a side frame having an opening to receive an end of the bolster, stabilizing means cooperatively arranged with the bolster and including means on the side frame providing a chafing surface which, in a downward direction, is inclined away from the central vertical plane passing longitudinally of the bolster, wedge means arranged between the chafing surface and the inclined bolster surface and having a complementary surface engaging said chafing surface, a second converging surface complementarily engaging the bolster surface, said wedge means being adapted to be forced downwardly with respect to the side frame and outwardly and upwardly with respect to the bolster in response to a downward movement of the bolster and said wedge means being adapted to be forced upwardly with respect to the side frame and inwardly and downwardly with respect to the bolster upon rebound of the bolster to exert a greater dampening effect upon the bolster upon its rebound, and resilient means cooperatively arranged with respect to the wedge means and the bolster to yieldably maintain the wedge means in contacting engagement with the chafing surface and with the bolster.

3. In combination with a bolster, a side frame having an opening to receive an end of the bolster, stabilizing means cooperatively arranged with the bolster and including means on the side frame providing a chafing surface which, in a downward direction, is slightly inclined away from the central vertical plane passing longitudinally of the bolster, wedge means having a complementary surface engaging said chafing surface, said bolster having a side bearing surface which, in a downward direction, is inclined toward the central vertical plane passing longitudinally of the bolster, said wedge means having a complementary surface for engaging said bearing surface, said wedge means being adapted to be forced upwardly with respect to the bolster and outwardly with respect to the bolster in response to a downward movement of the bolster and a resilient means cooperatively arranged with respect to the wedge means and the bolster to yieldably resist downward movement of the wedge means with respect to the bolster.

4. In combination with a bolster, a side frame having an opening to receive an end of the bolster, stabilizing means cooperatively arranged with the bolster and including means on the side frame providing a chafing surface which, in a downward direction, is slightly inclined away from the central vertical plane passing longitudinally of the bolster, wedge means having a complementary surface engaging said chafing surface, said bolster having a side bearing surface which, in a downward direction, is inclined toward the central vertical plane passing longitudinally of the bolster, an adjustable member interposed between the wedge means and said bearing surface which accommodates itself to the position occupied by the bolster, said wedge means being adapted to be forced upwardly with respect to the bolster and outwardly with respect to the bolster in response to a downward movement of the bolster and a resilient means cooperatively arranged with respect to the wedge means to yieldably support the wedge means and the bolster in operative position with respect to the chafing surface and said bolster.

5. In combination with a bolster, a side frame having an opening to receive an end of the bolster, stabilizing means cooperatively arranged with the bolster and including means on the side frame providing a chafing surface, wedge means having a complementary surface engaging said chafing surface and interposed between the bolster and the chafing surface, resilient means cooperatively arranged with respect to the wedge means and the bolster to yieldably resist downward movement of the wedge means, and interengaging means between the lower portion of the wedge and the bolster and operative to positively hold the said lower portion within a predetermined fixed distance from the central vertical plane extending longitudinally of the bolster, permitting the assembly to be inserted in the opening in the side frame while out of contact with the chafing surface, said interengaging means of the wedge and bolster being freely disengageable when the wedge is shifted in a vertical direction and when so separated said wedge being free to move into operative engagement with the chafing surface.

6. In combination with a bolster, a side frame having an opening to receive an end of the bolster, stabilizing means cooperatively arranged with the bolster and including means on the side frame providing a chafing surface, wedge means having a complementary surface engaging said chafing surface and interposed between the bolster and the chafing surface, resilient means cooperatively arranged with respect to the wedge means and the bolster to yieldably resist downward movement of the wedge means, interengaging means between the lower portion of the wedge and the bolster and operative to positively hold the said lower portion within a predetermined fixed distance from the central vertical plane extending longitudinally of the bolster, permitting the assembly to be inserted in the opening in the side frame while out of contact with the chafing surface, said interengaging means of the wedge and bolster being freely disengageable when the wedge is shifted in a vertical direction and when so separated said wedge being free to move into operative engagement with the chafing surface, and means for retaining the resilient means in assembled relation with the wedge means and the bolster during this insertion of the bolster into the opening in the side frame.

7. In combination with a bolster, a bolster spring, a side frame having an opening to receive an end of the bolster, stabilizing means cooperatively arranged with the bolster, and including means on the side frame providing a chafing surface, a wedge block having a complementary surface engaging said chafing surface and interposed between said surface and the bolster, the bolster having a horizontal flange extending beneath the wedge block, said flange having an opening therein, a spring passing through said opening and interposed between the wedge block and the bolster spring to yieldably resist movement of the wedge block relative to the bolster, interengaging means on the wedge block and the bolster for retaining the wedge block in position on the bolster and out of contact with the chafing surface in placing the bolster on its bolster spring, and means carried by the wedge block for retaining its spring thereon during this assembling operation.

8. In combination with a bolster, a side frame having an opening to receive an end of the bolster, stabilizing means cooperatively arranged with the bolster and including means on the side frame providing a chafing surface which, in a downward direction, is slightly inclined away from the vertical axis of the bolster, wedge means having a complementary surface engaging said chafing surface, said bolster having a bearing surface which, in a downward direction, is inclined toward the vertical axis of the bolster, an adjustable member interposed between the wedge means and said bearing surface which accommodates itself to the position occupied by the bolster, said wedge means being adapted to be forced downwardly with respect to the side frame and outwardly and upwardly with respect to the bolster in response to a downward movement of the bolster, a resilient means cooperatively arranged with respect to the wedge means to yieldably support the wedge means in operative position with respect to the chafing surface and the bolster, interengaging means on the wedge means and the adjustable member and interengaging means on the wedge means and the bolster for retaining the wedge means and the adjustable member on the bolster and out of contact with the chafing surface during insertion of the bolster into the side frame.

9. In combination with a bolster, a side frame having an opening to receive an end of the bolster, stabilizing means cooperatively arranged with the bolster and including means on the side frame providing a chafing surface, which, in a downward direction, is inclined away from the central vertical plane passing longitudinally of the bolster, wedge means having a complementary surface engaging said chafing surface, said bolster having spaced apart, horizontally extending flanges and a connecting flange extending therebetween and forming a housing for receiving said wedge means, at least a portion of the surface in said housing in a downward direction being inclined toward the central vertical plane passing longitudinally of the bolster, said wedge means having a surface complementary to said inclined bolster surface and resilient means for urging said wedge means into engagement with the chafing surface and said housing surface to yieldably resist movement of the wedge means relative to the side frame.

10. In combination with a bolster having a side surface which in a downward direction is inclined toward the central vertical plane passing longitudinally of the bolster, a side frame having an opening to receive one end of the bolster, stabilizing means cooperatively arranged with the bolster and including means on the side frame providing a chafing surface which in a downward direction is inclined away from the central vertical plane passing longitudinally of the bolster, wedge means arranged between said chafing surface and said inclined bolster surface and having a complementary surface engaging said chafing surface, said wedge means being adapted to be forced upwardly with respect to the bolster and outwardly with respect to the bolster in response to a downward movement of the bolster and spring means cooperatively associated with the wedge means and the bolster to yieldingly urge the same into operative engagement with the chafing surface and the bolster, said spring means and wedge means being fastened together to facilitate manipulation thereof as a unit during assembly of the parts.

11. In combination with a bolster, a side frame providing an opening to receive an end of the bolster, stabilizing means cooperatively arranged with the bolster and including means on the side frame providing a chafing surface which, in a downward direction, is slightly inclined away from the central vertical plane passing longitudinally of the bolster, wedge means having a complementary surface engaging said chafing surface, said bolster having means forming a side bearing surface which in a downward direction is inclined toward the central vertical plane passing longitudinally of the bolster, said wedge means having a complementary surface for engaging said bearing surface, said wedge means being adapted to be forced upwardly with respect to the bolster and outwardly with respect to the bolster in response to a downward movement of the bolster, and resilient means cooperatively arranged with respect to the wedge means and the bolster to yieldably resist downward movement of the wedge means with respect to the bolster.

12. In combination with a bolster, a side frame having an opening to receive an end of the bolster, stabilizing means cooperatively arranged with the bolster and including means on the side frame providing a pair of chafing surfaces on opposite sides of the side frame which in a downward direction are slightly inclined away from the central vertical plane passing longitudinally of the bolster, a pair of wedge means, each having a complementary surface, which complementary surfaces respectively engage said chafing surfaces, said bolster having means forming a pair of bearing surfaces on either side of said bolster opposite said chafing surfaces, which bearing surfaces in a downward direction are inclined toward the central vertical plane passing longitudinally of the bolster, said pair of wedge means each having a complementary surface, which surfaces respectively engage said bearing surfaces, said pair of wedge means being adapted to be forced upwardly with respect to the bolster and outwardly with respect to the bolster in response to a downward movement of the bolster, and a pair of resilient means respectively cooperatively arranged with respect to said pair of wedge means and said bolster to yieldably resist downward movement of the wedge means with respect to the bolster.

13. A truck stabilizing device comprising a bolster structure including a bolster and spring means, a side frame having an opening in which one end of the bolster is received, said spring means supporting said bolster on said side frame, stabilizing means cooperatively arranged with said bolster and side frame, including means on the side frame providing a chafing surface, which in a downward direction is slightly inclined away from the central vertical plane passing longitudinally of the bolster, means associated with the bolster providing an oppositely disposed bearing surface which in a downward direction is inclined toward the central vertical plane passing longitudinally of the bolster, wedge means arranged with upwardly converging surfaces respectively engaging the said chafing surface and said bearing surface, and a second spring means arranged to act in a direction roughly parallel to the vertical axis of the bolster and to act between the wedge means and the bolster structure.

14. A truck stabilizing device comprising a bolster structure including a bolster and spring means, a side frame having an opening in which one end of the bolster is received, said spring means supporting said bolster on said side frame, stabilizing means cooperatively arranged with said bolster and side frame, including means on the side frame providing a chafing surface which in a downward direction is slightly inclined away from the central vertical plane passing longitudinally of the bolster, means associated with the bolster providing an oppositely disposed bearing surface which in a downward direction is inclined toward the central vertical plane passing longitudinally of the bolster, wedge means arranged with upwardly converging surfaces respectively engaging the said chafing surface and said bearing surface, and a second spring means arranged to act in a direction roughly parallel to the vertical axis of the bolster and to act between the wedge means and the bolster spring means.

15. A truck stabilizing device comprising a bolster structure including a bolster and spring means, a side frame having an opening in which one end of the bolster is received, said spring means supporting said bolster on said side frame, stabilizing means cooperatively arranged with said bolster and side frame, including means on either side of said side frame providing a pair of chafing surfaces, each of which in a downward direction is slightly inclined away from the central vertical plane passing longitudinally of the bolster, means associated with the bolster providing a pair of bearing surfaces disposed respectively on either side of said bolster opposite said chafing surfaces, each of which bearing surfaces in a downward direction is inclined toward the central vertical plane passing longitudinally of the bolster, a pair of wedge means respectively arranged on either side of the bolster, each of said wedge means being provided with upwardly converging surfaces, one of said surfaces on each wedge means engaging one of said chafing surfaces, and the other of said surfaces on each of said wedge means engaging the oppositely disposed bearing surface, and a pair of spring means, in addition to said first named spring means, arranged to act in a direction roughly parallel to the vertical axis of the bolster, one of said spring means being associated with each of said wedge means and arranged to act between the wedge means with which it is associated and the bolster structure.

ARTHUR C. DAVIDSON.

CERTIFICATE OF CORRECTION.

Patent No. 2,257,109. September 30, 1941.

ARTHUR C. DAVIDSON.

It is hereby certified that error appears in the printed specification of the above numbered patent requiring correction as follows: Page 4, first column, lines 52 and 53, claim 4, for "means to yieldably support the wedge means and the bolster" read --means and the bolster to yieldably support the wedge means--; and that the said Letters Patent should be read with this correction therein that the same may conform to the record of the case in the Patent Office.

Signed and sealed this 16th day of December, A. D. 1941.

(Seal)

Henry Van Arsdale,
Acting Commissioner of Patents.